E. M. COLE.
PLANTER.
APPLICATION FILED MAY 24, 1917.

1,290,090.

Patented Jan. 7, 1919.

Inventor
Eugene M. Cole
By H. L. Davis
Attorney

UNITED STATES PATENT OFFICE.

EUGENE M. COLE, OF CHARLOTTE, NORTH CAROLINA.

PLANTER.

1,290,090.　　　　　Specification of Letters Patent.　　Patented Jan. 7, 1919.

Application filed May 24, 1917. Serial No. 170,678.

*To all whom it may concern:*

Be it known that I, EUGENE M. COLE, a citizen of the United States, residing at Charlotte, in the county of Mecklenburg and State of North Carolina, have invented certain new and useful Improvements in Planters, of which the following is a specification.

This invention relates to planters, and particularly to novel seed dropping mechanism therefor.

More specifically, the invention has to do with planters of the type shown in my prior Patent No. 908,549, granted Jan. 5, 1909, and may be considered as an improvement upon the construction shown in this patent.

In the said patent, I have shown a seed box having an inclined disk rotatably mounted therein for picking up the seed and dropping them from an elevated outlet. In practice, I have found that under certain peculiar conditions where it is necessary to use this planter on a steep hillside, the angle at which the seed box is tilted interferes with the proper selection and dropping of the seed. The object of the present invention is to overcome this defect and to provide a planter of this type which will operate successfully on the steepest inclines encountered in practice.

In order that the invention may be clearly understood, reference is had to the accompanying drawing, forming a part of this specification, and in which, Figure 1 is a central, vertical section through my improved seed box and dropping mechanism;

Figure 1:
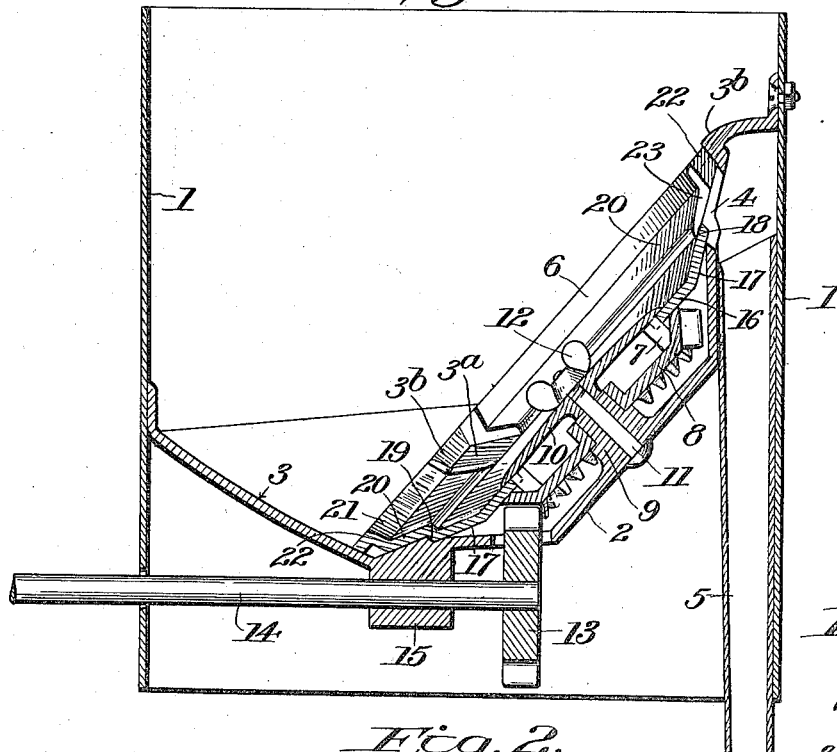

Referring to the drawings in detail, 1 designates the usual seed box, and 2 a casting mounted inside the box and constituting a bottom therefor. This casting is of irregular shape, comprising a bowl 3, and an inclined gear housing having at its upper edge a seed outlet 4, arranged to discharge seed into the spout or boot 5.

My improved seed selecting and dropping device is designated in its entirety by the reference numeral 6. As clearly shown in the drawing, it comprises a dish-shaped inclined disk having near its center, notches adapted to engage lugs 7 on a driving gear 8, as in my prior patent. This gear 8 is journaled on a boss 9, carried by the casting 2, and the parts are held in assembled relation by means of a cap or cover 10, secured in position by a bolt 11, passing centrally through the boss 9, and having on its upper end a wing nut 12.

The driving gear 8 meshes with a pinion 13, carried at the end of a shaft 14, journaled in suitable bearings 15. Motion is imparted to the shaft 14 in any suitable manner from the ground wheel. My improved seed selecting device or disk is of special construction and comprises a flat, central portion 16, disposed at right angles to the axis of rotation, and surrounded by an intermediate annular portion 17, disposed at an acute angle to the portion 16 and to the axis of rotation. This constitutes, in fact, a section of a cone. Surrounding the portion 17 is a second conical portion 20, parallel with the portion 17, but preferably off-set with respect thereto, so as to form a shoulder 18 on the upper face of the disk. A similar shoulder 19 is formed on the under surface of the disk and fits snugly into a corresponding groove formed in the casting 2.

Outside of the annular portion 20 is an upstanding marginal flange 21, having a flat upper face 22. Notches or openings 23 are cut through the upstanding marginal flange and the off-set annular portion 20, as clearly shown in Fig. 2, a flat annular surface 3$^a$ being formed in the casting 2 underneath these notches, such surface being flush with the surface of the angularly disposed portion 17 of the disk. The purpose of this is so that surplus seed caught in the notches 23 may readily be discarded by gravity and slide out of such notches over the surface 17 as the disk rotates.

Figure 4:
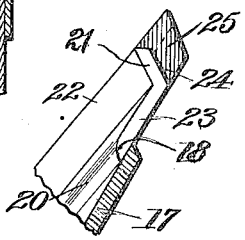
Figure 2:
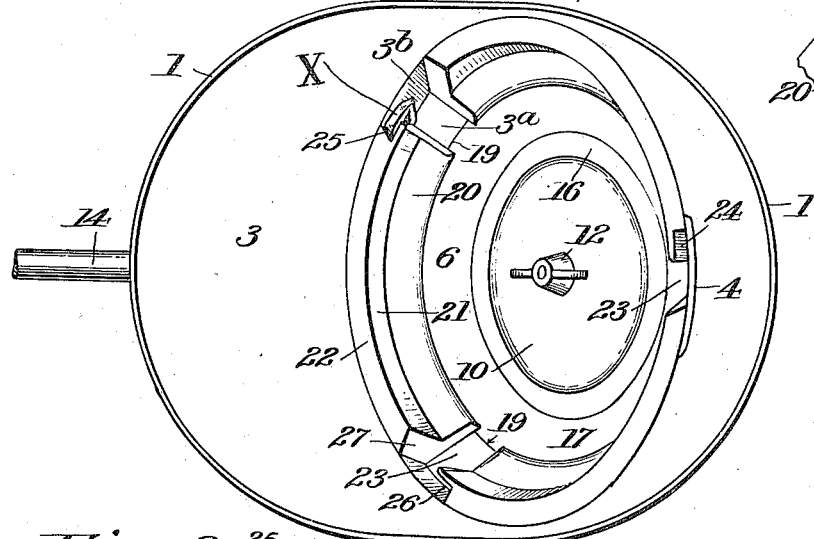
Fig. 2 is a plan view thereof.
Figure 3:
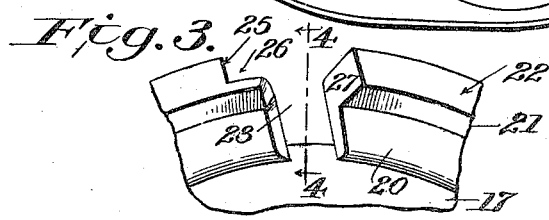
Fig. 3 is a detailed fragmentary elevation, on an enlarged scale, showing one of the notches or seed pockets; and, Fig. 4 is a section on the line 4—4 of Fig. 3, looking in the direction of the arrow.

One face of each of the notches 23 is smooth and flat, as indicated at 27, while in the outer edge of the other face is formed a seed-receiving pocket 26. Such recess or pocket has a flat end wall 25, but an inclined inner wall 24 (see Fig. 4) formed by the upstanding flange 21. The seed, such for example as a kernel of corn as indicated at X in Fig. 2, is caught in the pocket 26, being held between the inclined wall 24 and the parallel face 3$^b$ of a groove formed in the casting 2 to coöperate with the disk.

In operation, as the notches 23 pass the lowermost point of the seed box (which is at the bottom of the bowl 3) the notches will fill with seed, and this seed will be carried upward as the disk revolves. After each notch has passed above the axis of rotation, the surplus seed will begin to slide out of the notch over the surface of the portion 17 of the disk, and finally, all of the seed will have escaped from the notch except the single selected seed which is held in the pocket 26. This is carried around until the pocket passes the outlet opening 4, and then the seed is discharged through this opening into the spout 5. This operation is substantially the same as that described in my prior patent above mentioned, and it will be observed that the selection and discharge of the seed take place entirely by gravity, without the use of any brushes or scrapers.

As will be seen by reference to Fig. 1, the result of constructing the disk as described, with the angularly disposed or conical portions 17 and 20, is that these portions, when adjacent the outlet opening 4, approach more nearly a vertical position than does the flat body portion of the disk 16. It is therefore possible for the seed box to be greatly inclined, as on a hillside, without bringing the angularly disposed portions of the upper part of the disk so nearly into a horizontal position as to prevent the proper discarding of the surplus seed, as described. At the same time, the lower part of the angularly disposed portion 20 containing the seed pockets approaches more nearly the horizontal than does the body portion of the disk 16, thus facilitating the filling of such pockets with seed, especially when the supply of seed in the box is nearly exhausted. The dishing of the disk therefore, as described, facilitates both the filling of the seed pockets and the discharge of seed therefrom, and makes it possible to successfully use the planter on any incline which would be encountered in practice.

What I claim is:

1. In a planter, a seed box having an outlet disposed at a point above the bottom thereof, a rotary inclined element mounted in said box and serving to elevate the seed to said outlet, the seed carrying portion of said element being disposed at an acute angle to the axis of rotation, and movable over the outlet.

2. In a planter, a seed box having an elevated outlet, and an inclined dish-shaped disk rotatably mounted therein and serving to lift the seed to said outlet, said disk being arranged with its concave face uppermost, and having a marginal annular portion disposed at an angle to the central portion of the disk, such marginal portion having notches movable over said outlet and each notch having a seed receiving recess associated therewith.

3. In a planter, a seed box having an outlet relatively near the top thereof, and an inclined disk serving to carry seeds from the bottom of said box to said outlet, the marginal portion of said disk having seed notches therein and being disposed at an angle to the body of the disk, whereby such marginal portion adjacent the outlet more nearly approaches the vertical than does the inner portion of the disk.

4. In a planter, a seed box having an outlet relatively near the top thereof, and an inclined disk serving to carry seeds from the bottom of said box to said outlet, said disk having an annular portion near its margin disposed at an angle to the body of the disk and offset with respect thereto, said offset annular portion having seed receiving notches formed therein.

5. In a planter, a seed box having an outlet, and an inclined disk rotatably mounted therein, said disk having a central portion lying in a plane at right angles to the axis of rotation, an intermediate surrounding conical portion the elements of which are disposed at an angle to the central portion, and an annular portion outside of said intermediate portion, parallel therewith, but offset therefrom, and having seed notches movable over said outlet.

6. In a planter, a seed box having an outlet, and an inclined disk rotatably mounted therein, said disk having a central portion lying in a plane at right angles to the axis of rotation, an annular portion surrounding said central portion and disposed at an angle thereto, and an upstanding marginal flange outside of such annular portion and provided with seed pockets movable over said outlet.

In testimony whereof I have affixed my signature.

EUGENE M. COLE.

Copies of this patent may be obtained for five cents each, by addressing the "Commissioner of Patents, Washington, D. C."